(12) United States Patent
Bourgeais

(10) Patent No.: US 9,902,287 B2
(45) Date of Patent: Feb. 27, 2018

(54) METHOD AND SYSTEM FOR MANAGING ENERGY ON BOARD A VEHICLE

(71) Applicant: POWIDIAN, Chambray les Tours (FR)

(72) Inventor: Jean-Marie Bourgeais, Chambray les Tours (FR)

(73) Assignee: POWIDIAN, Chambray les Tours (FR)

( * ) Notice: Subject to any disclaimer, the term of this patent is extended or adjusted under 35 U.S.C. 154(b) by 0 days.

(21) Appl. No.: 15/024,340

(22) PCT Filed: Sep. 23, 2014

(86) PCT No.: PCT/FR2014/000212
§ 371 (c)(1),
(2) Date: Mar. 23, 2016

(87) PCT Pub. No.: WO2015/040290
PCT Pub. Date: Mar. 26, 2015

(65) Prior Publication Data
US 2016/0244008 A1    Aug. 25, 2016

(30) Foreign Application Priority Data

Sep. 23, 2013   (FR) .................................... 13 59118

(51) Int. Cl.
*B60L 11/18* (2006.01)
*B60R 16/03* (2006.01)
*B60R 16/033* (2006.01)
*H01M 16/00* (2006.01)
(Continued)

(52) U.S. Cl.
CPC ....... *B60L 11/1887* (2013.01); *B60L 11/1881* (2013.01); *B60R 16/03* (2013.01); *B60R 16/033* (2013.01); *H01M 16/00* (2013.01);
*H01M 16/003* (2013.01); *H01M 16/006* (2013.01); *C25B 1/04* (2013.01); *C25B 15/02* (2013.01); *H01M 2220/20* (2013.01); *H01M 2250/20* (2013.01); *Y02E 60/366* (2013.01); *Y02P 20/133* (2015.11); *Y02P 20/134* (2015.11); *Y02T 90/32* (2013.01)

(58) Field of Classification Search
CPC .. B60L 11/1887; B60L 11/1881; B60R 16/03; B60R 16/033; H01M 16/00; H01M 16/003; H01M 16/006
See application file for complete search history.

(56) References Cited

U.S. PATENT DOCUMENTS

| 5,858,568 A | * | 1/1999 | Hsu ..................... B60L 11/1881 429/425 |
| 5,964,309 A | * | 10/1999 | Kimura ............... B60L 11/1887 701/22 |
| 6,516,905 B1 | | 2/2003 | Baumert et al. |

(Continued)

FOREIGN PATENT DOCUMENTS

| DE | 19703171 | 8/1998 |
| EP | 1568601 | 8/2005 |

*Primary Examiner* — Dale W Hilgendorf
(74) *Attorney, Agent, or Firm* — Steven M. Greenberg, Esq.; CRGO Law

(57) ABSTRACT

A system and a method for managing power on board a vehicle is described herein, that allows power to be provided to electrical equipment of the vehicle in an optimized manner from a plurality of power sources without the charge of the equipment disrupting the electrical network of the vehicle.

11 Claims, 2 Drawing Sheets

(51) Int. Cl.
 C25B 15/02 (2006.01)
 C25B 1/04 (2006.01)

(56) References Cited

U.S. PATENT DOCUMENTS

| | | | |
|---|---|---|---|
| 6,635,373 B2* | 10/2003 | Kobayashi | H01M 16/006 429/423 |
| 2002/0016662 A1* | 2/2002 | Belschner | B60L 11/1881 701/70 |
| 2002/0064697 A1* | 5/2002 | Sugiura | B60L 11/1881 429/431 |
| 2003/0118876 A1* | 6/2003 | Sugiura | B60L 11/1887 429/432 |
| 2003/0137193 A1* | 7/2003 | Belschner | B60L 11/1881 307/9.1 |
| 2003/0217559 A1* | 11/2003 | Ieda | H01M 16/006 62/230 |
| 2004/0000909 A1* | 1/2004 | Kablaoui | B60L 11/1887 324/326 |
| 2004/0131902 A1 | 7/2004 | Frank et al. | |
| 2004/0159480 A1* | 8/2004 | Ishikawa | B60L 11/1887 429/430 |
| 2006/0170390 A1 | 8/2006 | Kikuchi et al. | |
| 2008/0085430 A1* | 4/2008 | MacBain | B60L 11/1887 429/432 |
| 2014/0197684 A1* | 7/2014 | Masato | B60L 11/1864 307/9.1 |

* cited by examiner

METHOD AND SYSTEM FOR MANAGING ENERGY ON BOARD A VEHICLE

CROSS-REFERENCE TO RELATED APPLICATIONS

This application is a § 371 national phase entry of International Application No. PCT/FR2014/000212, filed Sep. 23, 2014, which claims priority to French Patent Application No. 1359118, filed Sep. 23, 2013.

TECHNICAL FIELD AND OBJECT OF THE INVENTION

The present invention relates to the field of power management and relates in particular to a method and to a system for managing power on board a vehicle.

PRIOR ART

A road vehicle comprises, in a known manner, an engine allowing the wheels of the vehicle to be driven and an electrical network configured to power the electrical equipment of the vehicle. Such an electrical network conventionally comprises a battery for powering said electrical equipment and an alternator arranged to charge the battery when the engine of the vehicle is in operation.

The equipment of the vehicle is conventionally equipment for driving the vehicle, such as the dashboard, the controls for opening and closing the windows, the controls for actuating the windscreen wipers, etc. This electrical equipment may also be onboard equipment for a specific use, such as electronic medical devices, a mobile telecommunications system, a mobile video surveillance system, a refrigeration system, etc. However, some of this onboard equipment may require a significant electrical power supply.

In such a case, it is known to either replace the alternator with a more powerful alternator or to add one or more power sources on board the vehicle, such as additional batteries or a diesel generator.

Replacing the standard alternator of the vehicle with a specific, more powerful alternator is complex, expensive and increases the level of noise emitted by the vehicle. In addition, in the case of a standard vehicle of which the engine is an internal combustion engine, the use of the alternator to power the onboard equipment requires the engine to be in operation and therefore requires exhaust gases to be released, which is not feasible in a confined space such as a garage.

Likewise, adding a diesel generator is complex, expensive and increases the level of noise emitted by the vehicle. Here again, in the case of a standard vehicle of which the engine is an internal combustion engine, the use of a diesel generator to power the onboard equipment requires the engine to be in operation and therefore requires exhaust gases to be released, which is not feasible in a confined space.

Moreover, adding additional batteries is expensive and reduces the space available in the vehicle while significantly increasing its weight. In addition, if the batteries are connected to the alternator, the number of batteries is limited by the power of the alternator. By contrast, if the batteries are independent of the alternator, they have to be charged by another means, and this involves a connection, for example to a local fixed power-distribution network, which may be disadvantageously expensive and restrictive.

In addition, if the alternator is replaced and/or batteries are added, the electrical charge of the equipment connected to the electrical network of the vehicle may disrupt operation, for example by discharging the battery/batteries, eventually rendering the vehicle inoperative.

In order to overcome these drawbacks, it is known to install a power regeneration system in the vehicle which produces hydrogen from a current provided by the alternator of the vehicle.

Such a system, as described in WO2004049479 (A2), comprises an electrolyser which produces hydrogen when it is powered by the alternator of the vehicle when its engine is in operation. The hydrogen is stored in a container and then used to power a fuel cell that produces electricity. The electricity thus produced may then be used at any time, in particular when the engine of the vehicle is switched off, in order to power electrical equipment of the vehicle.

However, this system has the significant drawback of only using a single power source, which is a first drawback.

This power is also only produced when the engine of the vehicle is in operation, which is a second drawback.

Lastly, the electrical charge of the equipment connected to the electrical network of the vehicle may disrupt operation and eventually render the vehicle inoperative, which is a third drawback.

GENERAL DESCRIPTION OF THE INVENTION

The present invention aims to overcome the drawbacks of the existing solutions at least in part by proposing a system and a method for managing power on board a vehicle that allows power to be provided to electrical equipment of the vehicle in an optimized manner from a plurality of power sources without the charge of said equipment disrupting the electrical network of the vehicle.

To this end, the invention first relates to a method for managing power on board a vehicle comprising a power management system, said system comprising a first electrical network, a second electrical network and at least one piece of electrical equipment, said first electrical network comprising at least one module for generating electrical current that is configured to produce and/or store electrical power, said second electrical network comprising at least one electrochemical generator unit and at least one module for storing electrical power, the method being distinctive in that, the first electrical network and the second electrical network being galvanically isolated from one another and the electrical equipment being connected to the second electrical network, it comprises:

a step of determining a level of electrical power produced and/or stored by the module for generating electrical current, when the level of electrical power produced and/or stored by the module for generating electrical current is above a first threshold, a step of generating hydrogen by means of the electrochemical generator unit from electrical power provided by the module for generating electrical current and, when the electrical power of the second network is above a second threshold, a step of providing electrical power to the electrical equipment by means of the second network, when the level of electrical power produced and/or stored by the module for generating electrical current is below the first threshold and when the electrical power of the second network is above the second threshold, a step of providing electrical power to the electrical equipment by means of the second network.

The term "galvanically isolated" means that there is no galvanic connection between the first electrical network and the second electrical network. In other words, the first electrical network and the second electrical network are not interconnected by an electrical conductor (for example an electrical wire, a metal frame, etc.), the respective earths thereof also being separate. For example, a transformer allows for galvanic isolation since only electromagnetic induction is used at the interface between the two circuits. Likewise, an optical coupler allows for galvanic isolation between the two circuits, a luminous flux ensuring that the signals are transmitted between the two circuits, and it only being possible for the signals having low electrical power, for example numerical data, to be transmitted.

The electrical equipment is thus powered solely by the second electrical network, which is advantageously galvanically isolated from the first network and in which electrical power is stored and produced. Such galvanic isolation makes it possible to prevent the equipment of one of the circuits from disrupting the equipment of the other circuit by emitting parasitic voltages.

Preferably, the vehicle comprising an engine designed to move said vehicle and the module for generating electrical current being suitable for providing an electrical current at least in part from mechanical power generated by said engine, the method comprises a preliminary step of detecting whether the engine of the vehicle is in operation or switched off, the method steps being implemented when it has been detected that the engine is in operation. Such an engine may for example be a combustion engine or a hybrid engine.

In the case of an electric motor or a hybrid engine, the module for generating electrical current comprises one or more batteries for storing electrical power that can be used by the engine to move the vehicle.

More preferably, when the level of electrical power produced and/or stored by the module for generating electrical current is above the first threshold, the method further comprises a step of charging the module for storing electrical power from electrical power produced and/or stored by the module for generating electrical current.

According to an aspect of the invention, when it has been detected that the engine is switched off, the method comprises a step of supplying electrical power to the electrical equipment by means of the second network.

According to another aspect of the invention, when the engine is switched off, the step of supplying electrical power to the electrical equipment is carried out from the module for storing electrical power and/or, the second electrical network further comprising at least one intermittent source of electrical power, from said intermittent source of electrical power.

Advantageously, the method comprises a step of storing generated hydrogen.

According to an aspect of the invention, said method further comprises a step of generating electricity from hydrogen generated by the electrochemical generator unit, for example in order to charge the module for storing electrical power or to power the electrical equipment.

According to another aspect of the invention, the supply of electrical power to the electrical equipment by the second network may be interrupted or reduced depending on the electrical power available in the second network, for example when the power level of the module for storing electrical power reaches a third threshold and/or when the level of stored hydrogen reaches a fourth threshold.

Advantageously, the method may comprise a step of determining the presence of a local electrical-power distribution network. When the presence of such a distribution network is detected, the storage module may be powered and/or hydrogen may be generated by the electrochemical generator unit from electrical power originating from the electrical-power distribution network.

The invention also relates to a management module comprising means for determining a level of electrical power produced and/or stored by the module for generating electrical current, first means for controlling means for supplying electrical power to the second network by means of the first network and second means for controlling means for supplying electrical power to the electrical equipment by means of the second network.

Preferably, the management module comprises means for detecting whether the engine of the vehicle is in operation or switched off.

The invention also relates to a system for managing power on board a vehicle, said system comprising a first electrical network, a second electrical network and at least one piece of electrical equipment, said first electrical network comprising at least one module for generating electrical current that is configured to produce and/or store electrical power, said second electrical network comprising at least one electrochemical generator unit and at least one module for storing electrical power, the system being distinctive in that the first electrical network and the second electrical network are galvanically isolated from one another, in that the electrical equipment is connected to the second electrical network and in that the system comprises:
 a management module as set out above,
   means for supplying electrical power to the second network by means of the first network, and
   means for supplying electrical power to the electrical equipment by means of the second network.

Preferably, the system comprises at least one intermittent source of electrical power.

Such an intermittent source may be, for example, a solar-powered module such as a solar panel, a wind-powered module, a local electrical-power distribution network, a hydrokinetic turbine or any other type of intermittent electrical power source.

WO2012/123350 A1, filed by the applicant, discloses a system for generating power from a plurality of sources. This system is not suitable for operating by being coupled to an electrical network of a vehicle. The power management system according to the invention advantageously makes it possible to install, use and control such a system on a vehicle.

According to an aspect of the invention, the electrochemical generator unit is designed to produce hydrogen from a first electrical current and to generate a second electrical current from said hydrogen that is produced.

According to another aspect of the invention, the system comprises storage means, for example a tank for storing hydrogen generated by the electrochemical generator unit.

Preferably, the module for storing electrical power is in the form of one or more batteries.

According to a feature of the invention, the first electrical network may comprise at least one second module for storing electrical power, for example a battery that is intended to power driving equipment of the vehicle.

Preferably, the vehicle comprises an engine designed to move the vehicle.

In the case of a combustion engine, the module for generating electrical current advantageously comprises an alternator that is arranged to produce an electrical current from mechanical power originating from the engine.

In the case of a hybrid engine, the module for generating electrical current advantageously comprises an alternator that is arranged to produce an electrical current from mechanical power originating from the engine and at least one battery for storing electrical power that is arranged to supply said engine with electrical power.

In the case of an electric motor, the module for generating electrical current comprises at least one battery for storing electrical power that is arranged to supply said motor with electrical power.

The module for generating electrical current may also comprise a regenerative braking unit that is arranged to produce an electrical current from mechanical power originating from the braking system of the vehicle.

According to another aspect of the invention, the electrical equipment may be, for example, a computer, a telecommunications apparatus, an electronic medical device in an ambulance, a mobile telecommunications system, a mobile video surveillance system, a refrigeration unit for a refrigerated vehicle, etc.

The invention also relates to a vehicle comprising a system as set out above.

The vehicle may for example be a transport vehicle, for example a logistics vehicle such as a lorry, in particular a military vehicle or a vehicle for transporting refrigerated products, an ambulance, etc.

Other features and advantages of the invention will become clear upon reading the following description with reference to the accompanying drawings, which are provided by way of non-limiting example and in which similar objects are provided with the same reference numerals.

DETAILED DESCRIPTION OF THE INVENTION

System According to the Invention

Figure 1:
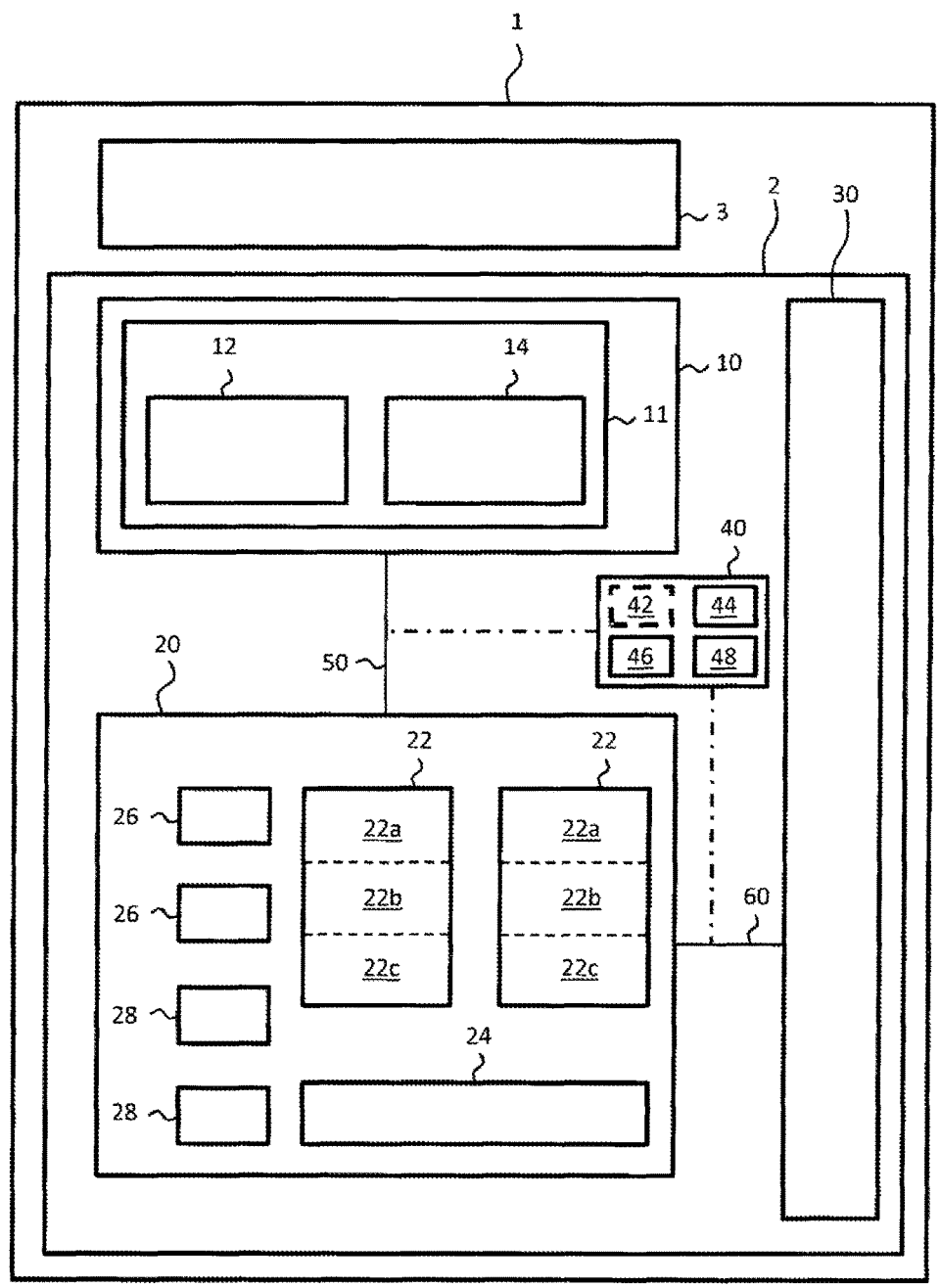
FIG. 1 shows an embodiment of the system according to the invention.
Figure 2:
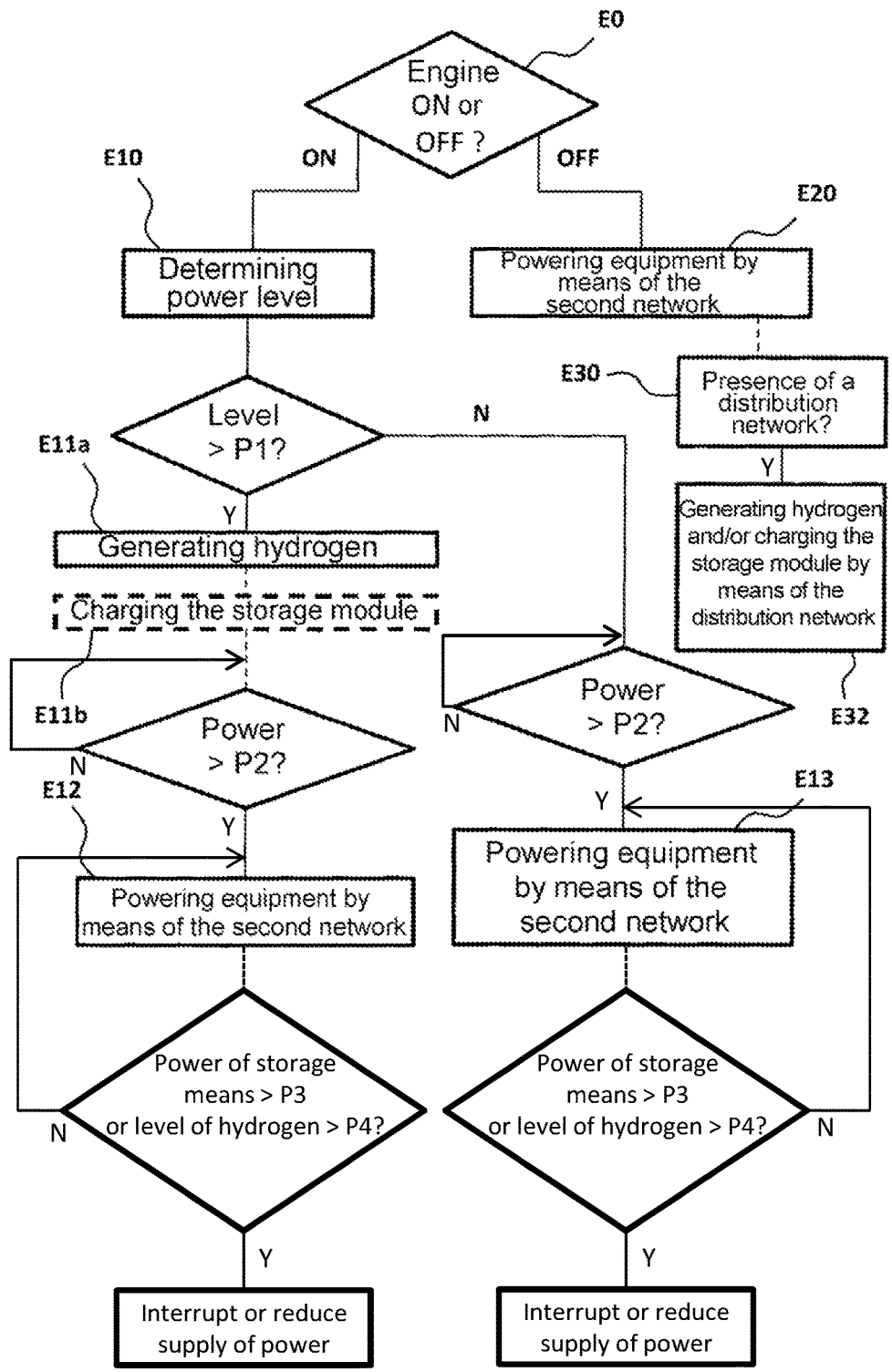
FIG. 2 shows an embodiment of the method according to the invention.

FIG. 1 schematically shows a vehicle 1 comprising an embodiment of a power management system 2 according to the invention. Such a vehicle 1 may be, for example, a military transport logistics vehicle, a medical vehicle, a vehicle for transporting refrigerated products, etc. It is clear that the invention is applicable to any vehicle comprising one or more pieces of electrical equipment requiring an electrical power supply.

According to the invention, such a vehicle 1 comprises at least one engine 3 designed to move the vehicle 1.

The engine may be a combustion engine, a hybrid engine or an electric motor.

The system 2 according to the invention comprises a first electrical network 10, a second electrical network 20 connected to said first electrical network 10 by means 50 for supplying electrical power, at least one piece of electrical equipment 30 connected to said second electrical network 20 by means 60 for supplying electrical power, and a power management module 40.

First Electrical Network 10

The first electrical network 10 comprises a module 11 for generating electrical current.

In the case of a combustion engine or a hybrid engine, the module 11 for generating electrical current comprises an alternator 12 suitable for generating an electrical current from mechanical power originating from the engine 3 when it is in operation.

In the example shown, the module 11 for generating electrical current further comprises a regenerative braking unit 14 that is known to a person skilled in the art.

The regenerative braking unit 14 is suitable for generating an electrical current from mechanical power originating from braking the wheels (not shown) of the vehicle 1, the movement of which is generated by the engine 3.

In the case of an electric motor, the module 11 for generating electrical current comprises one or more batteries (not shown) for powering said motor that are arranged to store electrical power.

The first electrical network 10, which is the standard electrical network of the vehicle 1, that is to say the network for providing electrical power to the driving equipment (not shown) of the vehicle 1, conventionally comprises a battery (not shown) for storing electrical power that is intended to power driving equipment of the vehicle 1, such as the dashboard of the vehicle 1 or the starter. Such a battery can be recharged by the alternator 12 and/or by the regenerative braking unit 14.

The first electrical network 10 comprises one or more AC/DC voltage conversion modules (not shown) that are mounted in parallel at the output of the module 11 for generating electrical current.

Second Electrical Network 20

In the example shown in FIG. 1, the second electrical network 20 comprises two electrochemical generator units 22, a module 24 for storing electrical power and a plurality of intermittent sources of electrical power comprising two solar-powered modules 26 and two wind-powered modules 28. It is clear that the second electrical network 20 may comprise a single electrochemical generator unit 22 or more than two electrochemical generator units 22 and/or a single solar-powered module 26 or more than two solar-powered modules 26.

An electrochemical generator unit 22 is designed to produce hydrogen from a first electrical current and to generate a second electrical current from said hydrogen that is produced.

More specifically, such an electrochemical generator unit 22 comprises an electrolyser 22a that is designed to generate hydrogen from the first electrical current, a container 22b for storing said hydrogen and a fuel cell 22c configured to generate the second electrical current from the hydrogen stored in the container 22b.

The first electrical current may be provided by the alternator 12, by the regenerative braking unit 14, by a battery for powering an electric motor (not shown) or by an intermittent source of electrical power 26, 28.

The module 24 for storing electrical power may be in the form of one or more electrical batteries generating, for example, a continuous voltage of 24 V.

The solar-powered module 26 is arranged to generate an electrical current from solar power and may comprise a plurality of solar panels.

The wind-powered module 28 is arranged to generate an electrical current from the wind power and comprises a wind turbine. Likewise, it is clear that the second electrical network 20 may comprise a single wind-powered module 28 or more than two wind-powered modules 28.

It is also clear that the second electrical network 20 may comprise other intermittent sources of electrical power, for example of the hydrokinetic type or of another type.

The second electrical network 20 may further comprise one or more modules for converting AC/DC voltage that are mounted in parallel at the output of the wind-powered modules 28 or in the region of a connection to a local electrical-power distribution network (known as a "grid"), and one or more modules for converting AC/DC voltage that are mounted in parallel at the output of the solar-powered modules 26.

The first electrical network 10 and the second electrical network 20 are galvanically isolated from one another. To do this, the system 2 may comprise, for example, one or more electrical transformers (for an analogue power conversion) and/or one or more optical couplers (not shown) (for a digital power conversion) that are mounted between the first electrical network 10 and the second electrical network 20.

Electrical Equipment 30

The electrical equipment 30 installed in the vehicle 1 may require significant power consumption and is preferably equipment intended for a use that is not for driving the vehicle 1, such as a computer, a telecommunications apparatus, electronic medical devices in an ambulance, a mobile telecommunications system, a mobile video surveillance system, a refrigeration system for a refrigerated vehicle, etc.

Management Module 40

In this example, the management module 40 comprises detection means 42, determination means 44, first control means 46 and second control means 48.

The detection means 42 make it possible to detect whether the engine 3 of the vehicle 1 is in operation or switched off. In the case of an electric motor, the management module does not necessarily comprise detection means 42 since the power provided by the module 11 for generating electrical current is stored in one or more batteries (not shown) and may be provided when the motor is in operation as well as when it is switched off.

The determination means 44 allow an electrical power level produced by the module 11 for generating electrical current to be determined when the engine 3 of the vehicle 1 is in operation.

The first control means 46 make it possible to control the means 50 for supplying electrical power to the second network 20 by means of the first network 10.

The second control means 48 make it possible to control the means 60 for supplying electrical power to the electrical equipment 30 by means of the second network 20.

The management module 40 may for example be in the form of a computer configured to implement the detection means 42, the determination means 44, the first control means 46 and the second control means 48.

Implementation of the Invention a) Combustion Engine or Hybrid Engine

The method according to the invention comprises a step E0 of detecting whether the engine 3 of the vehicle 1 is in operation or switched off.

When the engine 3 is in operation, that is to say when electrical power is produced by the module 11 for generating electrical current, the determination means 44 of the management module 30 determine, in a step E10, the level of electrical power produced by the module 11 for generating electrical current.

When the level of electrical power produced by the module 11 for generating electrical current is above a first threshold P1, the control means 46 of the management module 40 control, in a step E11a, the provision of an electrical current by the module 11 for generating electrical current that allows the electrolyser 22a of the electrochemical generator unit 22 to generate hydrogen in order to store this hydrogen in the container 22b so that it is later converted into electrical power by the fuel cell 22c. In this example, the provision of an electrical current by the module 11 for generating electrical current also allows the module 24 for storing electrical power to be charged (step E11b).

When the electrical power of the second network 20 is above a second threshold P2, the control means 46 of the management module 40 control, in a step E12, the supply of electrical power to the electrical equipment 30 by the second network 20, primarily by means of the storage means 24 but also, when said means produce power, by means of one or an assembly of the solar-powered modules 26 and wind-powered modules 28.

When the level of electrical power produced by the module 11 for generating electrical current is below the first threshold P1 and when the electrical power of the second network 20 is above the second threshold P2, the control means 46 of the management module 40 control, in a step E13, the supply of electrical power to the electrical equipment 30 by the second network 20, primarily by means of the storage means 24 but also, when said means produce power, by means of one or an assembly of the solar-powered modules 26 and wind-powered modules 28.

The supply of electrical power to the electrical equipment 30 by the second network 20 may be interrupted or reduced (step E16 or E17) depending on the electrical power available in the second electrical network 20, for example when the power level of the module 24 for storing electrical power reaches the third threshold P3 and/or when the level of hydrogen stored in the container 22b reaches a fourth minimum threshold P4 (step E14 or E15).

Lastly, when the engine 3 of the vehicle 1 is switched off, the electrical equipment 30 is powered, in a step E20, solely by the second network, here too primarily by means of the storage means 24 but also, when said means produce electrical power, by means of one or an assembly of the solar-powered modules 26 and wind-powered modules 28.

When the vehicle 1 is switched off in a confined space or is not in use, a step E30 of determining the presence of a local electrical-power distribution network (which is for example known to a person skilled in the art as a "grid") may be carried out by the management module 40.

When the presence of such a distribution network is detected, the storage module 24 can be charged and/or hydrogen is generated by the electrochemical generator unit, in a step E32, from electrical power provided by the local electrical-power distribution network.

b) Electric Motor

In the case of an electric motor, when the module 11 for generating electrical current comprises one or more batteries for storing electrical power for powering said motor 3, the determination means 44 of the management module 30 determine, in a step E10, the level of electrical power stored in the batteries of the module 11 for generating electrical current.

When the level of electrical power stored by the module 11 for generating electrical current is above a first threshold P1, the control means 46 of the management module 40 control, in a step E11a, the provision of an electrical current by the module 11 for generating electrical current that allows the electrolyser 22a of the electrochemical generator unit 22 to generate hydrogen in order to store this hydrogen in the container 22b so that it is later converted into electrical power by the fuel cell 22c. In this example, the provision of an electrical current by the module 11 for generating electrical current also allows the module 24 for storing electrical power to be charged (step E11b).

When the electrical power of the second network 20 is above a second threshold P2, the control means 46 of the management module 40 control, in a step E12, the supply of electrical power to the electrical equipment 30 by the second network 20, primarily by means of the storage means 24 but also, when said means produce power, by means of one or an assembly of the solar-powered modules 26 and wind-powered modules 28.

When the level of electrical power stored by the module 11 for generating electrical current is below the first threshold P1 and when the electrical power of the second network 20 is above the second threshold P2, the control means 46 of the management module 40 control, in a step E13, the supply of electrical power to the electrical equipment 30 by the second network 20, primarily by means of the storage means 24 but also, when said means produce power, by means of one or an assembly of the solar-powered modules 26 and wind-powered modules 28.

The supply of electrical power to the electrical equipment 30 by the second network 20 may be interrupted or reduced depending on the electrical power available in the second electrical network 20, for example when the power level of the module 24 for storing electrical power reaches the third threshold P3 and/or when the level of hydrogen stored in the container 22b reaches a fourth minimum threshold P4.

Lastly, when the level of electrical power stored by the module 11 for generating electrical current is below the first threshold P1, the electrical equipment 30 is powered solely by the second network 20, here too primarily by means of the storage means 24 but also, when said means produce electrical power, by means of one or an assembly of the solar-powered modules 26 and wind-powered modules 28.

When the vehicle 1 is switched off in a confined space or is not in use, a step E30 of determining the presence of a local electrical-power distribution network (which is for example known to a person skilled in the art as a "grid") may be carried out by the management module 40.

When the presence of such a distribution network is detected, the storage module 24 and/or the batteries for powering the electric motor can be charged and/or hydrogen can be generated by the electrochemical generator unit 22, in a step E32, from electrical power provided by the local electrical-power distribution network.

The invention therefore advantageously makes it possible to manage the electrical power of the vehicle 1 in an optimized manner depending on the state of the engine 3 and the time intervals at which the electrical power is produced and is available.

The use of two galvanically isolated networks allows this optimized management while preventing the electrical charge of the equipment 30 of the vehicle 1 from disrupting the first electrical network 10 of the vehicle 1 to which the driving equipment thereof is connected, and vice versa.

The invention claimed is:

1. A method for managing power delivery to electrical equipment on board a vehicle comprising:
   determining a first level of electrical power produced, stored or produced and stored by an electrical current generating module of a first electrical network of a power management system on board the vehicle, and determining a second level of electrical power of a second electrical network of the power management system galvanically isolated from the first electrical network; and,
   responsive to a determination that the first level of electrical power produced, stored or produced and stored by the electrical current generating module exceeds a first threshold, generating hydrogen by means of an electrochemical generator unit of the second electrical network from electrical power produced by the electrical current generating module and,
   responsive to a determined second level of the electrical power of the second network exceeding a second threshold, providing electrical power to the electrical equipment by means of the second network, and when the first level of electrical power produced by the electrical current generating module is below the first threshold and when the second level of the electrical power of the second network is above the second threshold, providing electrical power to the electrical equipment by means of the second network.

2. The method according to claim 1, wherein, the vehicle comprises an engine adapted to move the vehicle and the electrical power provided by the electrical current generating module includes electrical current generated at least in part from mechanical power produced by the engine, the method further comprising a preliminarily detecting whether the engine of the vehicle is in operation or switched off, and responding to a determination that the levels of electrical power exceed the first or second thresholds only when it has been detected that the engine is in operation.

3. The method according to claim 2, further comprising, when it has been detected that the engine is switched off, supplying electrical power to the electrical equipment by means of the second network.

4. The method according to claim 3, wherein supplying electrical power to the electrical equipment is carried out either from an electrical power storing module of the second electrical network or from an intermittent source of electrical power.

5. The method according to claim 1, wherein, when the first level of electrical power produced, stored, or produced and stored by the electrical current generating module above the first threshold, charging an electrical power storing module of the second electrical network with electrical power produced, stored, or produced and stored by the electrical current generating module.

6. The method according to claim 1, wherein a supply of electrical power to the electrical equipment by the second electrical network is variably interrupted or reduced depending upon power available in the second electrical network when either a third power level of an electrical power storing module of the second electrical network reaches a third threshold or when a fourth level of hydrogen stored in a container of the electrochemical generator unit reaches a fourth threshold.

7. The method according to claim 1, further comprising generating electricity from hydrogen generated by the electrochemical generator unit in order to charge an electrical power storing module of the second electrical network or to power the electrical equipment.

8. A computer data processing system comprising:
   a computer with memory and a processor disposed on board a vehicle; and,
   a management module comprising program code enabled during execution of the code in the computer to determine a first level of electrical power produced, stored, or produced and stored by an electrical current generating module of a first electrical network on board the vehicle, to supply electrical power by means of the first electrical network to a second electrical network on board the vehicle that is galvanically isolated from the first electrical network, and to supply electrical power to electrical equipment of the vehicle by means of the second electrical network.

9. A vehicle power management system for managing power on board a vehicle, said system comprising:
a first electrical network, a second electrical network electrically isolated from the first electrical network and at least one piece of electrical equipment connected to the second electrical network, said first electrical network comprising at least one module for generating electrical current that is configured to produce and/or store electrical power, said second electrical network comprising at least one electrochemical generator unit and at least one module for storing electrical power;
a computer with memory and at least one processor in which a management module executes, the management module comprising program code enabled during execution of the code in the computer to determine a first level of electrical power produced, stored, or produced and stored by the electrical current generating module of the first electrical network on board the vehicle, to supply electrical power by means of the first electrical network to the second electrical network and to supply electrical power to the electrical equipment of the vehicle by means of the second electrical network.

10. The system according to claim 9, further comprising at least one intermittent source of electrical power selected from the group consisting of a solar-powered module, a wind-powered module, a local electrical-power distribution network and a hydrokinetic turbine.

11. A vehicle comprising:
an engine moving the vehicle;
a piece of electrical equipment disposed in the vehicle;
a first electrical network, a second electrical network electrically isolated from the first electrical network and connected to the piece of electrical equipment, said first electrical network comprising at least one module for generating electrical current that is configured to produce and/or store electrical power, said second electrical network comprising at least one electrochemical generator unit and at least one module for storing electrical power;
a computer disposed within the vehicle, the computer comprising memory and at least one processor; and,
a management module executing in the computer, the management module comprising program code enabled during execution of the code in the computer to determine a first level of electrical power produced, stored, or produced and stored by the electrical current generating module of the first electrical network on board the vehicle, to supply electrical power by means of the first electrical network to the second electrical network and to supply electrical power to the electrical equipment of the vehicle by means of the second electrical network.

* * * * *